May 17, 1960  G. I. ROBERTS  2,936,961
STATOR COIL WINDING DEVICE
Filed April 26, 1954  4 Sheets-Sheet 1
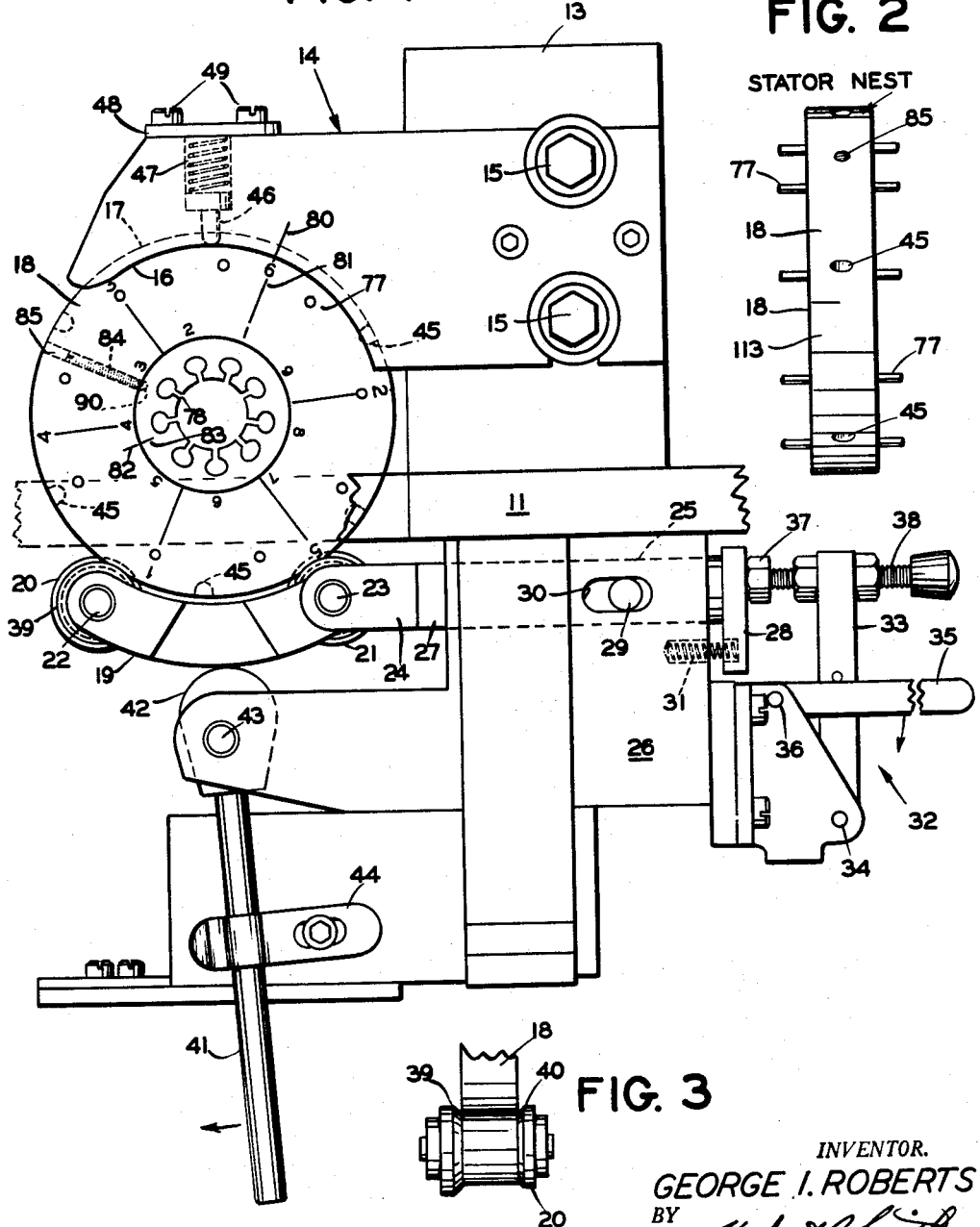
FIG. 1
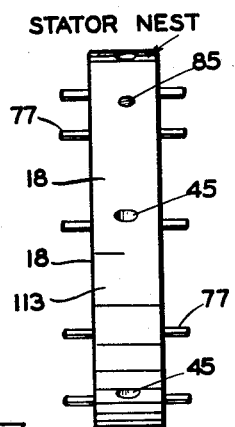
FIG. 2
STATOR NEST
FIG. 3
INVENTOR.
GEORGE I. ROBERTS
BY
ATTORNEY May 17, 1960  G. I. ROBERTS  2,936,961
STATOR COIL WINDING DEVICE
Filed April 26, 1954  4 Sheets-Sheet 2
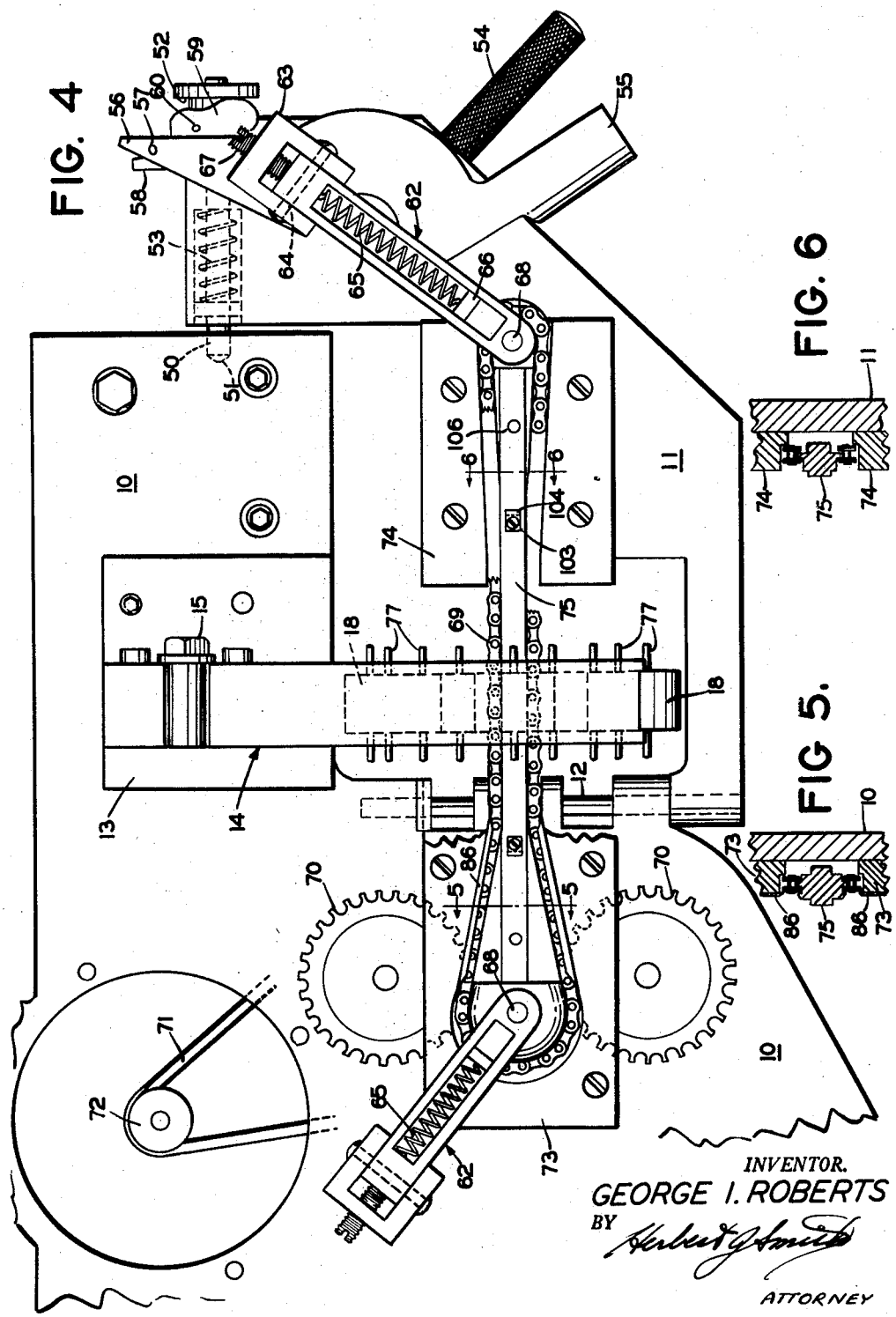
INVENTOR.
GEORGE I. ROBERTS
BY
ATTORNEY May 17, 1960 G. I. ROBERTS 2,936,961
STATOR COIL WINDING DEVICE
Filed April 26, 1954 4 Sheets-Sheet 3
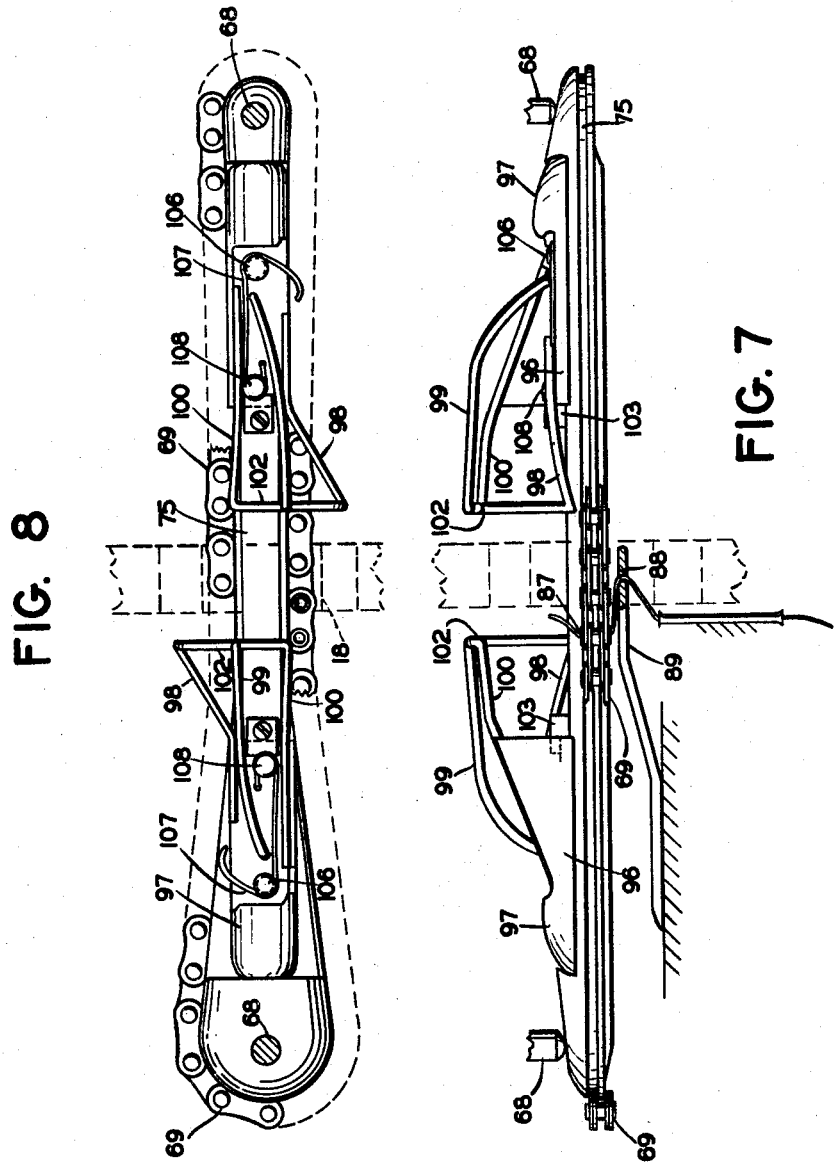
INVENTOR.
GEORGE I. ROBERTS
BY
ATTORNEY May 17, 1960 G. I. ROBERTS 2,936,961
STATOR COIL WINDING DEVICE
Filed April 26, 1954 4 Sheets-Sheet 4

INVENTOR.
GEORGE I. ROBERTS
BY
ATTORNEY

United States Patent Office 2,936,961
Patented May 17, 1960

2,936,961

STATOR COIL WINDING DEVICE

George I. Roberts, Maywood, N.J., assignor to Bendix Aviation Corporation, Teterboro, N.J., a corporation of Delaware Application April 26, 1954, Serial No. 425,527

10 Claims. (Cl. 242—1.1)

This invention relates to coil winding devices, and more particularly to a device for holding and indexing a stator during the winding of the coils directly into the slots of the stator.

The present invention may be used for example, in connection with coil winding machines of the general type described in the patent application of Kenly C. Bugg, Serial Number 305,891 for Coil Winding Apparatus now U.S. Patent No. 2,738,136, granted March 13, 1956.

Heretofore, devices for winding coils directly into the slots of a stator generally employed means for rotatably oscillating the stator back and forth to periodically align the stator slots with a wire feeding mechanism which was axially reciprocated through the bore of the stator for laying the wire in the respective stator slot between oscillations of the stator to form opposite sides of each complete convolution of wire of a stator coil.

The device of the present invention is of a type indicated in the above mentioned patent application which holds the stator stationary throughout the entire winding operation of each coil, and has a continuous wire feeder, such as a chain, for feeding the wire along guide means and into its respective stator slots.

More particularly, the improvements of the present invention over the type of coil winding device referred to in the above mentioned patent application relates to novel positive means for positionably holding and indexing the stator, which positive means is in turn positionably held by and indexed with a supporting structure. Novel coil end-turn forming means are used cooperatively with the stator holding means during the winding operation of each coil.

An object of the present invention is to provide a novel means of simple and robust construction to facilitate the winding of stator coils.

Another object of the invention is to provide a novel means for forming the end-turns of coils being wound on a stator.

Another object of the invention is to provide a novel means for positive postioning of the end-turns of coils relative to a stator on which said coils are being wound.

A further object is the provision of positive holding means on a movable stator nest for coil end-turns of a stator during the winding operation.

A further object of the invention is the provision of coil end-turn forming means which may be interchanged to facilitate and expedite the coil formation of a stator having distributed windings.

A still further object is the provision of novel coil forming and end-turn retaining means employed in a winding device utilizing a continuous link or belt type wire feeder.

A further object is the provision of novel means for supporting and aligning a stator during the coil winding operation, with the stator supporting and aligning means being operable by a simple yet positive mechanism.

A further object of the invention is to provide a device of the character set forth wherein a novel stator support is indexed and retained in predetermined alignment with the coil forming means.

A further object of the invention is the provision of a self-centering stator support for use in a coil winding device.

Another object of the invention is to provide a novel stator supporting assembly for coil winding.

Another object of the invention is the provision of novel indexing means and indicia for a stator, a stator nest, and a nest supporting assembly usable in coil winding.

The novel coil forming, stator support and associated assembly, and indexing arrangement contemplated in the present invention is an improvement of a coil winding device of the continuous feed type. The stator to be wound is held in a stator support referred to herein as a stator nest. The stator nest is in turn retained in a supporting structure assembly which has quick acting means for locking and unlocking the stator nest to facilitate rotation of the stator nest and its stator, between successive winding stages. Indexing means and suitable indicia are provided for relative positioning of the stator, the stator nest, and the stator nest supporting assembly.

End turn form guide means are removably positioned on either side of the stator, and are connected on the chain boat by a spring latch arrangement so that form guide means of different characteristics may be readily interchanged for different pitch coils to expedite production, particularly when used for distributed windings. The purpose of the end turn form guide means is to guide the wire into the stator slots and onto the end turn forming means carried by the stator nest.

Prepositioned end turn forming means, or hooks, are carried by the stator nest so that the end turns or loops of the individual coils are formed on and held by the hooks throughout the successive winding operations. The hooks hold the end turns clear of intervening stator slots. The stator remains in the stator nest after the stator is completely wound and thereafter removed from the winding machine with the stator nest. The stator coils are suitably wedged in their respective stator slots during further production processing, and before the stator nest is removed from the stator.

The foregoing and other objects and advantages of the invention will appear more fully hereinafter from a consideration of the detailed description which follows, taken together with the accompanying drawings wherein one embodiment of the invention is illustrated. It is to be expressly understood however, that the drawings are for the purposes of illustration and description, and are not to be construed as defining the limits of the invention.

In the drawings:

Figure 1 is an end view of the device showing the stator nest and its supporting assembly having representative indexing means.

Figure 2 is a view of the stator nest taken at a 90° angle from that shown in Figure 1.

Figure 3 is a side view of the roller carried by the roller bracket.

Figure 4 is a plan view showing the stator nest assembly mounted in relation to a coil winding machine of the continuous chain wire-feeding type.

Figure 5 is a sectional view of the feeder chain on the chain float taken along lines 5—5 of Figure 4.

Figure 6 is a view taken along lines 6—6 of Figure 4.

Figure 7 is a side view of the feeder means support having the form guide and feeder means operatively positioned thereon.

Figure 8 is a top view of the elements shown in Figure 7.

Figure 9:
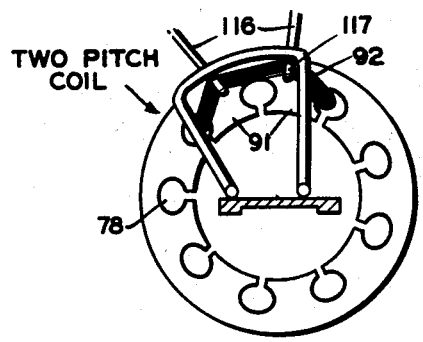
Figures 9 and 10 are views partially showing different form guide-surfaces on guide plates relative to the stator end-turn forming means.

Referring to the drawings, and more particularly to Figures 1 and 4, there is shown a base 10 having a gate 11 pivotally mounted on said base by way of a pivot pin 12, said gate being adapted to swing downwardly from the position shown in Figure 4.

A supporting assembly for the stator nest includes a stator nest supporting bracket 13 mounted in an upright position on the base 10, with a stator nest support 14 secured to the bracket 13 by means of bolts 15. The stator nest support has an arcuate channel 17 formed therein with curved portions 16 providing channel sides, to engage a portion of the stator nest 18.

A roller bracket 19 has a pair of rollers 20 and 21 mounted thereon by way of pins 22 and 23, respectively. Pin 23 is also used as a pivot pin for mounting the roller bracket 19 on the slideable yoke 24, which yoke is laterally slideable in an opening 25 formed in the main bracket 26. A yoke stop 27 and a yoke shoulder 28 formed on the yoke at opposite sides of the opening 25 act as limiting means for the yoke. The yoke also has additional positioning and limiting means in the form of a yoke pin 29 movable in a slot 30 formed in the main bracket. A compression spring 31 placed between the main bracket 26 and the yoke shoulder 28 tends to move the yoke to the right. A clamp 32 is of conventional manufacture and, in general, has an arm 33 pivotally carried by the main bracket by way of pin 34 and a base member screwed on the main bracket. The yoke clamp operating lever 35 is pivotally mounted to its support by way of pin 36. A linkage, not shown, connects the arm 33 with the lever 35, so that when the lever 35 is moved downwardly, the button 37 carried on the adjustment screw 38 is moved away from engagement with the yoke shoulder 28. Rotation of the adjustment screw 38 controls positioning of the roller bracket 19. When the lever 35 is moved to its upward extremity, the button 37 engages the yoke shoulder 28 and urges the slideable yoke 24 to the left. The button retains said yoke in a predetermined position depending on the position of the screw 38 in relation to the arm 33.

The two rollers 20 and 21 are rotatable on their respective roller pins 22 and 23. Figure 3 shows one roller 20 engaging the stator nest 18. Inclined surfaces 39 and 40 are used as centering means to center and hold the stator nest in its final or operative position when the roller bracket is urged into engagement therewith after the placing of the stator nest in its arcuate channel 17 formed in the stator nest support 14. A stator nest clamping handle 41 has a cam 42 on one end thereof, which handle and cam are pivotally mounted, by means of a pin 43, on an extension of the main bracket 26.

The curvature of the cam 42 is such that after the stator nest 18 is placed between the stator nest support 14 and the roller bracket 19, movement of the handle to the right will cause the cam 42 to urge the roller bracket to pivot on its pivot pin 23, and move the free end of the bracket upwardly so that both rollers 20 and 21 adequately engage the stator nest, and center same as the handle 41 is moved to its extreme position to the right. In this position the handle is engaged by the spring clip 44 which holds the handle in its final locked position. The permissive friction of the rotatable stator nest between the stator nest support 14 and the bracket 19 is controlled by the positionally adjustable spring clip 44 which locks the handle 41.

In Figures 1 and 2, it will be seen that indexing holes such as 45 are formed on the circumferential periphery of the stator nest 18. A spring actuated detent 46 is urged downwardly by a spring 47. This spring is held in place by a plate 48 secured to the support 14 by screws 49. The purpose of the detent pin is to engage one of the several indexing holes 45 for mechanically indexing the stator nest in relation to the stator nest support of its supporting assembly.

In order to insert and remove the stator nest 18 from its supporting assembly, the gate 11 which is pivoted to the base 10 by means of the pivot pin 12, must be unlatched and swung downwardly. The latching means for the gate includes a gate holding pin 50 which is carried by the gate 11 in a suitable orifice and has one end thereof adapted to fit into an opening 51, while the opposite end of said holding pin has a head portion with a camming surface 52 formed thereon.

A spring 53 is recessed in the orifice of the gate 11 and positioned about the holding pin 50 to urge said holding pin into the opening 51 formed in the base. A gate releasing means includes a post 54 which is secured to the gate 11 to be used in conjunction with the pivot handle 55 which is pivoted to the gate. A projection 56 of the pivotal handle 55 has a pin 57 therein, which pin engages the end of a lever 58, forming part of the camming lever 59 having a camming surface therein. This latter lever is pivoted by pin 60 to the gate 11. The camming surface of the lever 59 engages the camming surface 52 so that when the pivot handle 55 is moved toward the post 54, the pivot handle will operate the camming lever 59 so that the gate holding pin 50 is removed from the opening 51 formed in the base to permit the gate to be swung downwardly.

A wire holdback 62 is an elongated arm pivoted to the bracket 63 by means of a holdback pivot 64, said holdback pivot being affixed to and movable with the pivotal handle 55 so that when the gate 11 is unlocked the wire holdback 62 swings outwardly and clear of the feeder means support thus permitting a stator to be inserted or removed over the feeder means support. A spring 65 has one end connected to the bracket 62 and the other end thereof connected to a slidable bar 66 carried in opposed channels formed in holdback 62, so that the adjustment screw 67 may be turned to move said bar and vary the tension of the spring 65. The free end of the wire holdback 62 has a holdback pin 68 which, under influence of the spring 65, yieldably engages an upper surface of a chain float. The pin 68 is used as a release means for the wire during the winding operation.

A detailed operation of similar parts used for the actual winding operation is also set forth in the aforementioned patent application.

The device includes a feeder means or continuous chain 69 which is driven by sprockets 70, which are in turn actuated by a drive belt and motor 71 and 72 respectively. The feeder means or continuous chain 69 is movably mounted on a feeder means support or chain float 75 and is positioned in channels formed in chain guides 73 and 74.

A cover plate 86 in the area of the drive sprockets 70, overlaps the edges of the links of chain guide 73 as shown in Figures 4 and 5. It will be noted that no cover plate is used on the chain guide 74. By this arrangement, once the gate 11 is dropped after release of the gate holding pin 50 from the base, the stator nest supporting assembly may be unclamped and the stator nest and its coil wound stator may be removed by urging said stator nest toward the right hand side of the machine, as depicted in Figure 4. The coil wound stator may then be processed in production for completion of the necessary work on the stator, while the stator remains in the stator nest throughout these required operations.

To keep the coil winding machine in production winding, as soon as the coil wound stator and stator nest have been removed from the stator nest supporting assembly, another stator nest and unwound stator is placed in the stator nest supporting assembly, properly aligned by the alignment indicia, then indexed in the stator nest supporting assembly and clamped ready for winding the new stator.

A link wire guide 87 is actually a hole extending axially through one of the link pivots so that the wire which is to be wound in the slots of the stator may be carried by said link wire guide through the bore of a stator as the wire is fed from a spool normally disposed below the machine.

The main wire guide 89 as seen in Figure 7, has an aperture 88 therein. The wire guide 89 extends within the bore of the stator below the chain or feeder means 69 during the winding operation.

The stator nest has a plurality of holding means or pins 77 positioned on each side of the stator nest to carry hooks for end-turn or loop forming of the coils.

In the presentation herewith, the stator is represented as having nine oblique or skewed slots such as 78. There is one pin such as 77 on each face of the stator nest for each of the stator slots. The slots and their respective pins are shown numbered on the stator nest, from one to nine, in a counter-clockwise direction in the position shown in Figure 1, with the numerals appearing on at least one surface of the stator nest opposite their respective stator slots.

The indexing positions are also numbered on at least one side of the stator nest toward the outer periphery and are numbered from one to six, in non-consecutive arrangement. Indexing indicia are used for visually aligning the stator in relation to the stator nest, and the stator nest in relation to the stator nest support. An engraved mark or scribe line 80 is made on the stator nest support adjacent the curved portion thereof. Each of the index numbers from one to six have a scribe line such as 81 so that when one of the scribe lines such as 81 is aligned with the scribe line 80, one of the indexing holes 45 formed in the stator nest is aligned to receive the spring actuated detent pin 46. The stator nest is held in its proper position when the handle 41 is used to urge the roller bracket 19 against the stator nest and hold the latter in relation to the stator nest support 14. After the stator nest is clamped in operative position, it is firm and stationarily held, but it may be rotated by hand from one indexing position to another without releasing the clamp by manipulating handle 41.

The visual indicia for aligning the stator within the stator nest is a scribe line 82 made on at least one side of the stator nest so that the scribe line may be aligned with a mark or other scribed line, such as 83, normally placed on one side of the stator in a predetermined position. When the stator is properly aligned within the stator nest, the stator securing means, such as screw 84, is located in the threaded hole 85 of the stator nest, may be threadably moved inwardly to engage the stator. A small indexing hole 90 or suitable notch may be formed in each stator so that when the stator is aligned in the stator nest by means of the complemental scribe lines, the stator securing screw 84 will be properly aligned with the indexing hole 90 in the stator.

Figure 10:
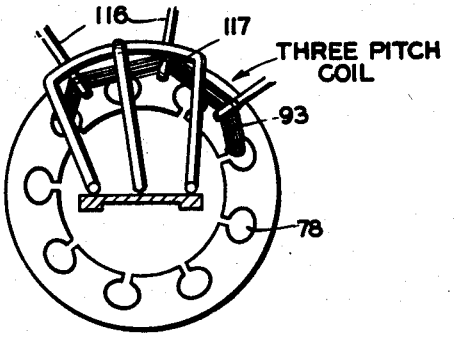
Figures 11, 12:
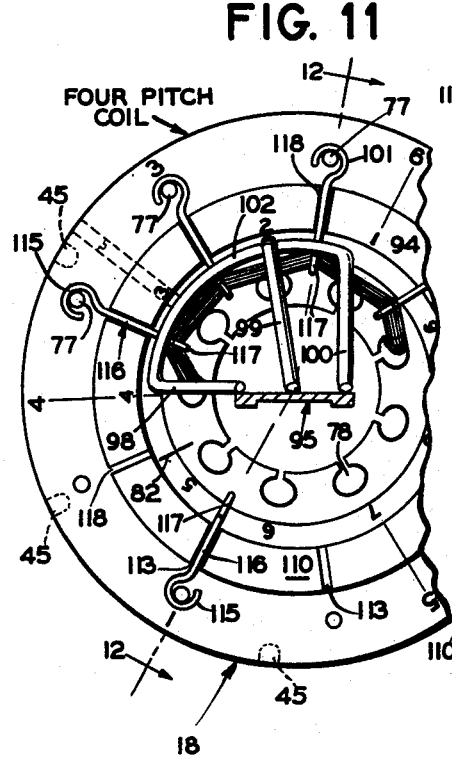
Figure 11 is a fragmentary view of the stator nest with a stator therein and a form guide having characteristics different from those shown in Figures 9 and 10.
Figure 12 is a side view taken along lines 12—12 of Figure 11 showing the stator, the end turn forming means, and form guide means in operative position with portions deleted or added for clarity.

In Figures 9 through 12 inclusive, there are shown 3 different variations of the form guide means adaptable for winding coils of different pitch. Figure 9 shows a form guide means for a two-pitch coil; Figure 10 shows a form guide means for a three-pitch coil, and Figure 11 shows a form guide means for a four-pitch coil.

In order to clarify the language of the present application, it is to be understood that in Figure 9 there are involved three slots such as 78 of the nine slots of the laminated stack forming the stator. There is one intervening slot of the three slots which is not involved in the winding of the particular coil shown, thus leaving two divisions such as 91, between the outside slots in which the coil 92 is formed. Therefore, the showing in Figure 9 is for a two-pitch coil. The showings in Figures 10 and 11 are for three and four-pitch coils 93 and 94, respectively.

The form guide means 95 for the four-pitch coil shown in Figures 11 and 12 has a guide plate or base 96 with an inclined shoulder 97 formed thereon. A network of ribs is shown having three separate longitudinal rib portions, one of which forms a slot guide surface 98 connected to the base 96 and extending outwardly therefrom so that as the wire is drawn over the slot guide surface, the wire will be guided into a particular slot. The central longitudinal rib 99 and the right hand rib 100 provide form guide surfaces so that the wire of the coil-to-be-wound will engage the inclined shoulder 97 and then be drawn upwardly over and then off of the form guide surfaces to be deposited on the several hook means 116. Rib 100 also acts as a slot guide to guide the wire out of the particular slot. For example, rib 100 will guide the wire out of the end of slot 9, so that the wire will lay in the proper slot.

A cross rib portion 102 is shown integral with the right hand rib 100 and also with the rib forming the slot guide surface 98. However, any other suitable arrangement or ribs or surfaces may be provided.

The form guide means 95, is a unitary structure of which there are two, one being disposed on each side of the stator as it is supported by the stator nest ready for winding a coil in a stator. Each of the form guide means are removably secured on the feeder means support 75 by way of a form guide limiting means 103 (Figure 4) which is an L-shaped member secured to the feeder means support and having a lip 104 under which the forward edge of the base 96 is placed.

An aperture 105 (Figure 12) formed in the guide plate or base 96 is adapted to receive a locking pin 106, of which there are two, one being positioned on the feeder means support 75 on each side of the stator. A form guide latch pawl 107 is secured by a pin 108 to the guide plate or base 96. The form guide latch pawl 107 is a resilient member, such as a piece of spring wire, which is bent to snap into a notch formed on the locking pin 106 (Figure 4) above the surface of the guide plate or base 96.

In normal operation, a set of identical form guide means 95 may be placed on the feeder means support 75 and readily snapped into position, or removed from the feeder means support by urging the free end of the latch pawl out of engagement with the annular notch in the pin 108. By this simple arrangement, a set of form guide means for a particular pitch coil may be readily interchanged with a set of form guide means for a different pitch coil.

The stator nest 18 has an annular channel 109 formed on each side thereof, with each channel being adapted to receive an annular ring 110. Both of the annular rings are held on the stator base 111 by means of screws 112 which pass through the stator base 111. However, any convenient means of securing the annular rings to the base of the stator nest may be provided.

Each of the annular rings has slots 113 formed therein, one slot being provided for each of the hook means 116. In Figure 12, the lower slot 113 is shown having the base of the channel slot substantially flush with the face of the base 111, while the base of channel slot 118 shown in the upper portion of Figure 12 is spaced from the face of the base 111. The head portions 115 of the hook means 116 are provided with a hook portion 117 disposed below the edge of the cross rib 102. All of the hook portions 117 of the hook means 116 are below and behind the cross rib 102 so that as the wire of the coil-to-be-formed is drawn over the form guide surfaces, the end turn of the wire will slide off of said guide surfaces and be deposited on the hook portions 117, of the particular hook means 116 provided for use with the particular form guide means as required by the pitch of the coil being wound.

In Figure 11, there is shown four hook means 116 so positioned and retained that each end turn of the wire is held clear radially of the intervening slots of the coil 94. This same condition obtains when the other sets of form guide means are used for winding either two-pitch or three-pitch coils as shown in Figures 9 and 10 respectively. While only form guide means are shown for coils having three different pitches, it is to be understood that the present showing is merely representative and that form guide means for other pitch coils are clearly intended. The form guide means are presented herein for skewed slots, but straight slots may also be used in a stator with the guide surfaces shaped accordingly.

While an annular ring 110 is shown having slots, it is to be understood that other means may be provided to form spacing means for holding the end turns of the coil in predetermined position relative to the stator since there is an overlapping of the various coils which requires predetermined spacing particularly when used with distributed windings.

The form guide means may be any means which provides surfaces which guide the wire into the desired slot and permit the wire to be drawn thereover to be received by supporting means carried on the stator nest to adequately form the end turns of the coil.

In the present showing, the form guide means includes a guide plate preferably having an inclined shoulder thereon with portions that provide form guide surfaces and a slot guide surface for use in conjunction with a stator nest.

The end turn or loop forming means are carried on the stator nest and includes holding means, spacer means and hook means.

The holding means on the stator nest are shown as pins, which are located to suit the hook means. The holding means also have another function, in that they are used for twisting the ends of the individual coils thereon so that as each coil is completed, the wire may be cut and the ends of the coil twisted about the pins to retain the end portions of the wire of each coil in their respective slots.

The spacer means may be individual members having only one slot therein for a particular hook. With this latter arrangement, the spacer means and hook means may be a hook member with the spacer means independently secured to the base 111.

The stator nest supporting assembly includes the stationary stator nest support, the movable stator nest support, and a stator nest clamping means. While the stator nest clamping means positions the stator nest between the stationary and movable portions of the stator nest support, the stator nest is sufficiently free in the arcuate channel and the rollers carried by the roller bracket to permit the stator nest to be rotated therein from one indexing position to another while always retaining its radial alignment relative to the longitudinal axis of the feeder support. The detent pin 46 under influence of its actuating spring has sufficient tension applied thereon to retain the stator nest in its indexed position as heretofore described. Consequently, the clamping handle 41 may clamp the stator nest in its supporting assembly and need not be further actuated throughout the complete winding of the stator because of the permissive turning action of the stator nest within its supporting assembly.

From the foregoing, it will be seen that after the stator and its stator nest is placed and clamped within its supporting assembly, the stator nest is not removed therefrom until after the stator is completely wound. The stator and its stator nest are then removed together and remain together until after the wedging of the coils within the stator and other operations are completed.

It will be seen that with the present arrangement the end turns of all of the coils and the terminating wire portions of each coil are held in place relative to the stator nest throughout the winding operation of each stator. Because of the hook means carried by the stator nest, the end turns are properly formed and retained in a predetermined position free of the intervening slots throughout the winding of all of the stator coils.

The stator nest supporting assembly provides means for accurately positioning the stator nest with reference to the radial position. Means are provided for positive indexing of the stator nest when rotated, and means are also provided on the stator nest for form winding of the end turns of the coils and for holding the terminal portions of the first and last turn of each coil.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a coil winding mechanism of a type including a supporting assembly for carrying therein a slotted unit in predetermined stationary alignment with a device for feeding wire through a bore of the unit; said supporting assembly comprising a nest for carrying the unit, and first and second means for securing the nest therebetween, said second securing means including a bracket means, a slidable yoke carried by said bracket means, adjustable means for holding said slidable yoke in predetermined position, other bracket means pivotally mounted on said slidable yoke, a handle pivotally mounted on the first-mentioned bracket means, said nest being rotatably adjusted manually between said first securing means and said other bracket means, said handle including a cam at one end thereof to operatively engage said other bracket means so as to bias the other bracket means into contacting relation with said nest so as to tend to retain the nest in an adjusted position between said other bracket means and said first-mentioned securing means, and spring means to hold the handle and cam in an operative relation to the other bracket means.

2. The combination defined by claim 1 in which said other bracket means includes an arcuate member, roller elements positioned at opposite ends of the arcuate member, and said roller elements having inclined surfaces to rotatably contact the next during the manual adjustment thereof and so as to urge the nest to an operative position.

3. The combination defined by claim 1 in which said nest includes an annular member for carrying the slotted unit, said annular member having a circumferential surface and indexing holes provided in said surface in predetermined relation, a detent member carried by said first securing means, and spring means for biasing said detent member into selective cooperative relation with each of said indexing holes upon said annular member being rotatably adjusted manually between said first securing means and said other bracket means so that said detent member tends to retain the annular member in a selectively adjusted index position relative to said first securing means and said other bracket means.

4. The combination defined by claim 1 in which said nest includes an annular member for carrying the slotted unit, said annular member having a circumferential surface and indexing holes provided in said surface in predetermined relation, a detent member carried by said first securing means, spring means for biasing said detent member into selective cooperative relation with each of said indexing holes upon said annular member being rotatably adjusted manually between said first securing means and said other bracket means so that said detent member tends to retain the annular member in a selectively adjusted index position relative to said first securing means and said other bracket means, said other bracket means including an arcuate member, roller elements positioned at opposite ends of the arcuate member, and said roller elements having inclined surfaces to rotatably contact the nest during the manual adjustment thereof and so as to urge the nest to an operative position.

5. In a coil winding mechanism for a device having slots opening at opposite ends of the device and into a bore of the device; said mechanism being of a type including means for carrying the device in predetermined stationary alignment with an apparatus for feeding wire through the bore of the device; the combination comprising a nest for holding the device, loop forming hook elements provided at opposite ends of said nest and positioned in predetermined relation to each of the slot openings at opposite ends of the device in such a manner as to receive wire end turns of a coil winding and retain the wire end turns clear of the last-mentioned openings, a nest supporting assembly to receive said nest and hold said nest stationary during winding operation of a complete coil of wire, a pair of form guide means, one form guide means being disposed at one side of said nest supporting assembly and the other form guide means being disposed at the other side of said nest supporting assembly, each of said form guide means including at least one guide element for guiding the wire of the coil into a predetermined slot of said device and another guide element for guiding wire end turns of said coil onto said loop forming hook elements.

6. In a coil winding mechanism for a device having slots opening at opposite ends of the device and into a bore of the device; said mechanism being of a type including means for carrying the device in predetermined stationary alignment with an apparatus for feeding wire through the bore of the device; the combination comprising a nest for holding the device, slot indicia on said nest for aligning the device in a predetermined position relative to said nest, means for securing the device in said nest as determined by said slot indicia, means for rotatably supporting the nest, spring means for retarding rotary adjustment of the nest in the supporting means, indicator means on said nest and supporting means for aligning said nest with the nest supporting means in predetermined relations so that different coil windings on the device may be effected, holding means on said nest for receiving hook means, and hook means on said holding means including elements extending radially inward to a position at one side of and between each of the slot openings at the opposite ends of the stator, and said elements including hook members for receiving wire end turns of the different coil windings during the winding thereof.

7. The combination defined by claim 6 including positioning means carried by said nest for positioning said hook members relative to the slot openings, and said positioning means including radial slots for receiving the radially extending elements of the hook means to position the elements in spaced relation one to the other and in predetermined relation to a surface of the nest.

8. The combination defined by claim 6 including a pair of form guide means disposed at opposite ends of the device, each of said form guide means including at least one guide element for guiding the wire into a predetermined slot of said device and another guide element for guiding wire end turns of said coils onto the hook members during the winding thereof.

9. The combination defined by claim 6 including positioning means carried by said nest for positioning said hook members relative to the slot openings, said positioning means including radial slots for receiving the radially extending elements of the hook means to position the elements in spaced relation one to the other and in predetermined relation to surfaces of the device and nest, a pair of form guide means disposed at opposite ends of the device, each of said form guide means including at least one guide element for guiding the wire into a predetermined slot of said device and another guide element for guiding the wire end turns of said coils onto the hook members for receiving the wire end turns of the coils during the winding thereof.

10. In a coil winding mechanism for a stator having slots opening at opposite ends of the stator and into a bore of the stator; said mechanism being of a type including a supporting assembly for carrying therein the stator in predetermined stationary alignment with a device for feeding wire through the bore of the stator; the combination comprising a nest for carrying the stator, and first and second means for securing the stator nest therebetween, said second securing means including a bracket means, a slidable yoke carried by said bracket means, adjustable means for holding said slidable yoke in predetermined position, other bracket means pivotally mounted on said slidable yoke, a handle pivotally mounted on the first-mentioned bracket means, said stator nest being rotatably adjusted manually between said first securing means and said other bracket means, said handle including a cam at one end thereof to operatively engage said other bracket means so as to bias the other bracket means into contacting relation with said stator nest so as to tend to retain the stator nest in an adjusted position between said other bracket means and said first-mentioned securing means, and spring means to hold the handle and cam in an operative relation to the other bracket means; said stator nest including an annular member for carrying the stator, said annular member having a circumferential surface and indexing holes provided in said surface in a predetermined relation, a detent member carried by said first securing means, and spring means for biasing said detent member into selective cooperative relation with each of said indexing holes upon said annular member being rotatably adjusted manually between said first securing means and said other bracket means so that said detent tends to retain the annular member in a selectively adjusted index position relative to said first securing means and said other bracket means; said other bracket means including an arcuate member, roller elements positioned at opposite ends of the arcuate member, and said roller elements having inclined surfaces to rotatably contact the stator nest during the manual adjustment thereof and so as to urge the stator nest to an operative position; slot indicia on said stator nest for aligning the stator in a predetermined position relative to said stator nest, and indicator means on said stator nest for aligning said stator nest with the stator nest supporting assembly in predetermined relations upon said annular member being rotatably adjusted as aforesaid so that different coil windings on the stator may be effected; holding means on said stator nest for receiving hook means, hook means on said holding means including elements extending radially inward to a position to one side of and between each of the slot openings at the opposite ends of the stator, and said elements including hook members for receiving wire end turns of the different coil windings during the winding thereof; positioning means carried by said stator nest for positioning said hook members relative to the slot openings, and said positioning means including radial slots for receiving the radially extending elements of the hook means to position the elements in spaced relation one to the other and in predetermined relation to a surface of the stator and stator nest, a pair of form guide means disposed at opposite ends of the stator, each of said form guide means including at least one guide element for guiding the wire into a predetermined stator slot and another guide element for guiding the wire end turns of said coils onto the hook members during the winding of stator coils.

(References on following page)

References Cited in the file of this patent

UNITED STATES PATENTS

| | | |
|---|---|---|
| 593,282 | Short | Nov. 9, 1897 |
| 855,134 | Risbridger | May 28, 1907 |
| 1,407,033 | Huggins | Feb. 21, 1922 |
| 1,531,177 | Corrigan | Mar. 24, 1925 |
| 2,977,828 | Laib et al. | Oct. 23, 1934 |
| 2,328,725 | Knobel | Sept. 7, 1943 |
| 2,356,864 | Martin et al. | Aug. 29, 1944 |
| 2,389,336 | Wirth | Nov. 20, 1945 |
| 2,468,223 | Mueller | Apr. 26, 1949 |
| 2,579,585 | Klinksiek | Dec. 25, 1951 |
| 2,738,136 | Bugg | Mar. 13, 1956 |